United States Patent [19]

Ingle

[11] Patent Number: 5,157,071

[45] Date of Patent: Oct. 20, 1992

[54] PAINTS AND POLYMERS FOR USE THEREIN

[75] Inventor: David M. Ingle, Hillsborough, N.C.

[73] Assignee: Union Oil Company of California, Los Angeles, Calif.

[21] Appl. No.: 774,730

[22] Filed: Oct. 9, 1991

Related U.S. Application Data

[63] Continuation of Ser. No. 400,124, Aug. 29, 1989, abandoned.

[51] Int. Cl.$^5$ .................. C08L 27/06; C08L 39/04
[52] U.S. Cl. .................. 524/516; 524/521; 524/523; 524/548; 524/551; 524/552; 524/555; 524/556; 524/558; 524/559; 524/808; 524/809; 524/812; 524/813; 524/818; 524/827; 524/832; 524/833
[58] Field of Search ............ 524/516, 519, 522, 523, 524/525, 528, 548, 555, 558, 521, 551, 552, 556, 559, 808, 809, 812, 813, 818, 827, 832, 833

[56] References Cited

U.S. PATENT DOCUMENTS

| | | | |
|---|---|---|---|
| Re. 31,936 | 7/1985 | Sperry et al. | 524/522 |
| 3,509,085 | 4/1970 | Sekmakas | 526/263 |
| 3,843,584 | 10/1974 | Turck | 526/318.25 |
| 4,172,177 | 10/1979 | Sato | 526/312 |
| 4,219,454 | 8/1980 | Iacoviello et al. | 526/331 |
| 4,395,524 | 7/1983 | Emmons et al. | 526/307.2 |
| 4,522,972 | 6/1985 | Mondt et al. | 524/555 |
| 4,632,957 | 12/1986 | Welsh et al. | 524/548 |
| 4,647,396 | 3/1987 | Denzinger et al. | 526/318.2 |
| 4,722,965 | 2/1988 | Wong et al. | 526/302 |
| 4,725,655 | 2/1988 | Denzinger et al. | 526/318.2 |
| 4,737,549 | 4/1988 | Börner et al. | 526/318.2 |
| 4,808,660 | 2/1989 | Schmeing et al. | 524/812 |
| 4,855,349 | 8/1989 | Ingle | 524/432 |

FOREIGN PATENT DOCUMENTS 0302588 8/1989 European Pat. Off. .

OTHER PUBLICATIONS

Grant, J., "Hackh's Chemical Dictionary", 4th Ed. McGraw-Hill, New York, 1969, p. 703.
ASTM D 2486-74a.

Primary Examiner—Joseph L. Schofer
Assistant Examiner—R. H. Delmendo
Attorney, Agent, or Firm—Gregory F. Wirzbicki; Shlomo R. Frieman

[57] ABSTRACT

Wet adhesion, ICI viscosity, and scrub resistance of a paint are improved by incorporating into the paint a binder that comprises a film former and polymeric composition. The polymeric composition comprises either (a) about 15 to about 35 weight percent of substantially non-self-polymerizable monomer, about 30 to about 70 weight percent of a copolymerizable monomer whose homopolymer is water-soluble, and about 10 to about 35 weight percent of a wet adhesion promoting monomer, or (b) about 35 to about 65 weight percent of the substantially non-self-polymerizable monomer and about 35 to about 65 weight percent of the wet adhesion promoting monomer. The polymeric composition and film former are substantially inseparable by chromatographic means.

17 Claims, No Drawings

PAINTS AND POLYMERS FOR USE THEREIN

This application is a continuation, of application Ser. No. 07/400,124, filed Aug. 29, 1989, now abandoned.

BACKGROUND

The present invention relates to polymer systems and, in particular, to latex paints, binders for use in latex paints, processes for the synthesis of binders, and polymeric components used in the binders.

Latex paints are a mixture of a multitude of ingredients. Typical ingredients include coalescing aids, thickening aids, dispersing aids, defoamers, biocides, pigments, and binders. The large numbers of ingredients makes it difficult to formulate latex paints. In addition, optional ingredients are also employed in latex formulations to enhance various paint properties. For example, rheology modifiers are employed to enhance a paint's film-build characteristics. Film-build is an indication of a paint's hiding power, i.e., an indication of how well one coat of the paint covers a surface. Since flat latex paints are generally applied over a much larger surface area, e.g., wall and ceiling surfaces, than the surface areas typically covered by semi-gloss latex paints, e.g., trim, film-build characteristics are especially important in flat latex paints.

In addition, wet adhesion promoters are employed to enhance a paint's adhesion to a surface. This is especially true in the case of paints containing vinyl acrylic-type binders.

However, use of rheology modifiers and wet adhesion promoters in paint formulations tends (a) to make it more difficult to formulate latex paints and (b) to adversely affect other latex paint properties.

SUMMARY OF THE INVENTION

The present invention provides a latex paint capable of exhibiting good film-build characteristics and good wet adhesion properties. The paint inherently possesses good wet adhesion and, in certain embodiments, good rheology so that the use of separate wet adhesion promoters and rheology modifiers for improved film build is unnecessary. This result is achieved by employing in the paint a binder that comprises about 97 to about 99.5 weight percent of a high molecular weight film former and about 0.5 to about 3 weight percent of a particular polymer.

In one version of the invention, the polymer comprises about 15 to about 35 weight percent of a substantially non-self-polymerizable monomer, about 30 to about 70 weight percent of a copolymerizable monomer having a water-soluble homopolymer, and about 10 to about 35 weight percent of a wet adhesion promoting monomer. As used in the specification and claims, the term "substantially non-self-polymerizable monomer" means a copolymerizable monomer that does not give high yields (i.e., yields greater than about 95 weight percent, and preferably greater than about 85 weight percent) of high molecular weight (i.e., greater than about 2,000 mw) homopolymer when reacted for about 3 hours at about 90° C. in the presence of about 1 weight percent potassium persulfate; and the term "water-soluble homopolymer" means a homopolymer that is dissolvable in water at a temperature of about 25° C. and at a concentration of at least about 25 g homopolymer per 100 ml water. This version of the invention provides a paint that exhibits good rheology and good wet adhesion are obtained.

In another version of the invention, the polymer comprises about 35 to about 65 weight percent of the substantially non-self-polymerizable monomer and about 35 to about 65 weight percent of the wet adhesion promoting monomer. Good wet adhesion is exhibited by paints of this latter embodiment. In both versions of the invention, the polymer and the film former are substantially inseparable by chromatographic means.

The invention also encompasses an emulsion comprising water and the polymer, a film formed by drying the paint, an article having a portion of its surface coated with film, and a process for synthesizing the binder.

The binder synthesis process comprises the steps of forming the polymer and polymerizing monomers in a reaction vessel to form the binder while delay adding the polymer to the reaction vessel. The term "delay adding" is a term of art that means adding ingredients during at least a portion of the polymerization period.

DETAILED DESCRIPTION OF THE INVENTION

In one embodiment of the present invention, the polymer comprises about 15 to about 35 weight percent of a substantially non-self-polymerizable monomer, about 30 to about 70 weight percent of a copolymerizable monomer having a water-soluble homopolymer, and about 10 to about 35 weight percent of a wet adhesion promoting monomer. In this version of the invention, the polymer preferably comprises about 20 to about 30 weight percent of the non-self-polymerizable monomer, about 40 to about 60 weight percent of the copolymerizable monomer, and about 15 to about 30 weight percent of the wet adhesion promoting monomer. More preferably, the polymer comprises about 45 to about 55 weight percent of the copolymerizable monomer.

In another embodiment of the invention, the polymer comprises about 35 to about 65 weight percent of the non-self-polymerizable monomer and about 35 to about 65 weight percent of the wet adhesion promoting monomer. The polymer of this embodiment preferably comprises about 45 to about 55 weight percent of the non-self-polymerizable monomer and about 45 to about 55 weight percent of the wet adhesion promoting monomer.

Exemplary non-self-polymerizable monomers include, but are not limited to, compounds having the formula I

wherein $R_1$ is hydroxy, alkoxy, or amino, $R_2$ is hydrogen or $CH_2COZ_1$, $R_3$ and $R_4$ are independently hydrogen or $COZ_2$, and $Z_1$ and $Z_2$ are independently hydroxy, alkoxy, or amino. Preferably, the compound of formula I contains no more that a total of three, and more preferably no more than a total of two, amino and/or carboxylic acid groups. Each alkoxy moiety generally contains from 1 to about 8 carbon atoms, and preferably from 1 to about 2 carbon atoms. Most preferably, $R_1$, $Z_1$, and $Z_2$ are hydroxy. One or more different compounds of formula I can be present in the polymer.

Illustrative compounds of formula I are itaconic acid, maleic acid, fumaric acid, itaconate ester, maleate ester, dimethylmaleate, and fumarate ester. Preferably, the non-self-polymerizable monomer is an acid-containing monomer, and most preferably is itaconic acid.

Typical copolymerizable monomers include, but are not limited to, N-vinyl lactams having the formula II

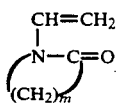

wherein m is an integer from about 3 to about 5 (preferably 3 or 4), and acrylates having the formula III and acrylamides having the formula IV

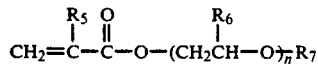

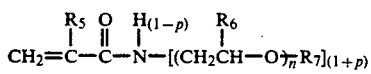

wherein $R_5$ and $R_6$ are independently hydrogen or methyl, $R_7$ is hydrogen or an alkyl group preferably containing 1 to about 30 carbon atoms, n is an integer from 1 to about 30, and p is either 0 or 1. More preferably, $R_7$ is hydrogen or an alkyl group containing about 12 to about 24 carbon atoms. When $R_7$ is hydrogen, n is preferably 1, and when $R_7$ is an alkyl group containing about 12 to about 24 carbon atoms, n is preferably within the range of about 20 to about 30.

The most preferred acrylates, and the most preferred copolymerizable monomers are 2-hydroxyethyl acrylate and 2-hydroxyethyl methacrylate. In addition, a single copolymerizable monomer or a mixture of the copolymerizable monomers can be present in the polymer.

Wet adhesion promoting monomers include, but are not limited to ethyleneureido-containing monomers, cyanoacetoxy-containing monomers, acetoacetoxy-containing monomers, and hydroxymethyl diacetone acrylamide. The ethyleneureido-containing monomers contain a ureido group of the formula V:

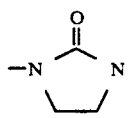

Exemplary ethyleneureido-containing monomers include, but are not limited to, 2-ethyleneureido-ethyl, acrylate, 2-ethyleneureido-ethyl acrylamide, 2-ethylemeureido-ethyl methacrylate, 1-[2-(3-allyloxy-2-hydroxypropylamino)ethyl]-imidazolidin-2-one. Mixtures of ethyleneureido-containing monomers can be present in the polymer. A commercially available ethyleneureido-containing monomer is 1-[2-(3-allyloxy-2-hydroxypropylamino)ethyl]-imidazolidin-2-one which is commercially known as Sipomer WAM brand monomer available from Alcolac.

Cyanoacetoxy-containing monomers and acetoacetoxy-containing monomers have the formulas VI and VII, respectively,

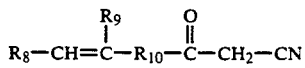

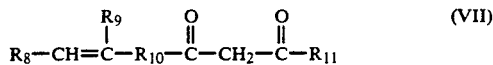

wherein $R_8$ is selected from the group consisting of hydrogen and halogen, $R_9$ is selected from the group consisting of hydrogen, halo, thio, and monovalent organic radicals, $R_{10}$ is a divalent radical, and $R_{11}$ is selected from the group consisting of hydrogen and monovalent organic radicals. As used throughout the specification and claims, the term "organic radical" means any group containing at least one carbon atom, and the term "inorganic radical" means any group devoid of carbon atoms.

Preferably $R_8$ is hydrogen, $R_9$ is hydrogen or an alkyl radical having up to about 10 carbon atoms, $R_{10}$ is a cyclic or acyclic organic radical containing up to about 40 carbon atoms, and $R_{11}$ is an acyclic organic radical containing up to about 15 carbon atoms. More preferably, $R_{10}$ is an acyclic radical containing up to about 20 atoms in length, with any and all side groups each being up to about 6 length, and $R_{11}$ is hydrogen or an alkyl group containing up to about 7 carbon atoms. $R_{10}$ is most preferably alkylene and alkoxylene groups containing up to about 10 carbon atoms, and $R_{11}$ is most preferably methyl. While acetoacetoxyethyl methacrylate, cyanoacetoxyethyl methacrylate, and allylacetoacetate are reported in the literature, and while acetoacetoxyethyl methacrylate and allylacetoacetate are commercial availability, acetoacetoxyethyl methacrylate is the choice acetoxy-containing monomer.

Optionally, the polymer comprises ethylene, a vinyl monomer, an acrylate monomer, an acrylamide monomer, an alkenyl aromatic monomer, and/or an alkadiene monomer. Typical vinyl monomers include, but are not limited to, vinyl halides, vinylidene halides, vinyl acetate, and acrylonitrile. Chlorine and bromine are exemplary halide moieties of vinyl halide and vinylidene halide monomers.

The acrylate monomers generally have the formula VIII

and acrylamide monomers generally have the formula IX

wherein $R_{12}$ is selected from the group consisting of hydrogen, alkyl groups containing 1 to about 6 carbon atoms, and halo-substituted alkyl groups containing 1 to about 6 carbon atoms, and $R_{13}$ and $R_{14}$ are each an alkyl group independently containing up to about 18 carbon atoms. Preferably, $R_{12}$ is selected from the group containing hydrogen and methyl, and $R_{13}$ and $R_{14}$ are each an alkyl group independently containing up to about 8 carbon atoms. Preferred acrylate monomers are selected from the group consisting of methyl acrylate, ethyl acrylate, ethyl methacrylate, and mixtures thereof. Ethyl acrylamide and methyl acrylamide, as well as mixtures of these two monomers, are the preferred acrylamide monomers.

As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula X

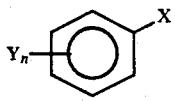
(X)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

Exemplary alkadiene monomers have the formula XI

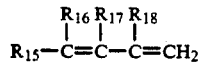
(XI)

wherein $R_{15}$, $R_{16}$, $R_{17}$, and $R_{18}$ are each independently selected from the group consisting of hydrogen, halogen, and alkyl radicals containing 1 to about 2 carbon atoms. Commercially available alkadiene monomers include butadiene, isoprene, 1,3-pentadiene, 2-ethyl butadiene, and 4-methyl-1,3-pentadiene. The preferred alkadiene monomer is butadiene.

Although the optional monomers can comprise up to about 30 weight of the polymer, the optional monomers preferably comprise about 1 to about 20 weight percent of the polymer. The non-self-polymerizable monomer, the wet adhesion promoting monomer, the copolymerizable monomer (when employed), and optional monomers (when employed) together generally constitute at least about 95 weight percent of the polymer, and preferably at least about 98 weight percent of the polymer.

In fact, it is frequently the case that the only additional ingredients present in the polymer are substances (e.g., surfactants, initiators) that are employed to aid in polymerizing the monomers.

The polymer is made, for example, by charging the monomeric ingredients, water, and a surfactant (when employed) into a reaction vessel, purging the reaction vessel with an inert gas, e.g., nitrogen, to remove essentially all the oxygen from the reactor vessel, and heating the reactor vessel to the reaction temperature, e.g. from about 80° to about 100° C. When the reactor vessel reaches the desired reaction temperature, an initiator is then added to the reaction vessel, and the reaction is continued for about 2 to about 4 hours. After the reaction is completed, the reactor vessel is cooled. This synthesis yields an aqueous polymeric composition comprising the polymer in water. In some instances, the composition has the appearance of a milky emulsion, while in other instances it looks like a clear solution.

Anionic, nonionic, and amphoteric surfactants can be employed in the polymer synthesis process. Exemplary anionic, nonionic, and amphoteric surfactants are Siponate A246L brand surfactant available from Alcolac, polyoxyethylene alkyl phenol surfactants, and N,N-bis-carboxyethyl lauramine, respectively. However in some instances, no surfactant is required.

Typical initiators include thermally generated free radical sources such as persulfates, perphosphates, and hydrogen peroxide. Generally, the initiator is employed in a concentration of about 0.5 to about 2 parts per hundred parts monomer by weight (phm), and preferably in a concentration of about 0.75 to about 1.25 phm.

The aqueous polymeric composition is used in the synthesis of a paint binder. Typically, the binder comprises about 0.5 to about 3 weight percent of the polymer and about 97 to about 99.5 weight percent of a high molecular weight film former. Preferably, about 0.7 to about 1.7 weight percent of the polymer and about 98.3 to about 99.3 weight percent of the film former are present in the binder.

The high molecular weight film formers are typically made from monomers selected from the group consisting of the above described ethylene and vinyl monomers, acrylate monomers, acrylamide monomers, alkenyl aromatic monomers, and alkadiene monomers.

A characteristic of the binder is that the polymer and film former are substantially inseparable by chromatographic means. As is shown below in the examples, this characteristic is important in enhancing the wet-adhesion properties of a paint containing the binder.

Typically, the binder is formed by synthesizing the film former while adding the polymer to the reaction medium during at least a portion of the synthesis procedure. Preferably, the polymer is added to the reaction medium during about the last 50 percent of the synthesis procedure, and more preferably during the last 25 percent of the synthesis procedure.

More specifically, the binder is prepared by charging water, a surfactant (e.g., anionic and nonionic surfactants), and a buffer (e.g., sodium bicarbonate) into a reactor and then heating the reaction to the desired reaction temperature, for example about 50° to about 90° C, while purging the reactor with an inert gas, e.g. nitrogen. An initiator system is then added to the reactor. The initiator system can be the above described thermally generated free radical sources or a redox system containing an oxidizing agent (e.g., hydrogen peroxide) and a reducing agent (e.g., sodium metabisulfite or erythorbic acid).

A film-forming monomer and an additional amount of the initiator system are then simultaneous fed into the reactor by separate feed streams. After a period of time, typically at least about 25 percent of the reaction time, the delay feed of the polymer is commenced. After all the monomer and polymer have been added to the reactor, the reaction is continued for about 15 minutes to about 1 hour and post-addition ingredients are then added to the reactor to reduce any residual monomer concentration.

The resulting binder typically has a high shear viscosity of at least about 90 cps measured at about 25° C. and about 12,000 sec$^{-1}$ shear rate. Preferably, the binder has a high shear viscosity of about 90 to about 1,000 cps measured at about 25° C and about 12,000 sec$^{-1}$ shear rate. More preferably, the binder has a high shear viscosity of about 100 to about 300 cps measured at about 25° C. and about 12,000 sec$^{-1}$ shear rate.

In addition, the binder typically has a low shear viscosity of about 100 to about 3,500 cps measured at about 25° C. and about 50 sec$^{-1}$ shear rate. Preferably, the binder has a low shear viscosity of about 250 to about 1,000 cps measured at about 25° C and about 50 sec$^{-1}$ shear rate.

The binder of the present invention is most preferably employed in a paint. Usually, paints have a solids content of at least about 50 percent by volume, and more typically about 50 to about 65 percent by volume. Generally, the paint comprises the binder, a pigment, and a carrier, e.g., water. In addition, the paint also typically comprises a coalescing aid, a thickening aid, a dispersing aid, a defoamer, and a biocide.

Depending upon the intended use of the paint, the pigment volume concentration (PVC) of the paint is generally less than about 35, or less than about 30, and even less than about 20. Paints of the present invention having a PVC content of about 20 to about 30 typically exhibit a wet adhesion of at least about 400, and preferably at least about 2,000, cycles wet scrub resistance on aged gloss alkyd paint.

In addition, the paint typically has a high shear viscosity of about 100 to about 500 cps measured at about 25° C. and about 12,000 sec$^{-1}$ shear rate. Preferably, the paint has a high shear viscosity of about 150 to about 300 cps measured at about 25° C. and about 12,000 sec$^{-1}$ shear rate.

With respect to low shear viscosity, the paint typically has a low shear viscosity of about 65 to about 110 Krebs units measured at about 25° C., and preferably about 80 to about 100 Krebs units measured at about 25° C.

The paint is applied to at least a portion of a surface of a substrate and, when dried, forms a film. For films made from paints having a PVC of at least about 60, the films have a scrub resistance of at least about 100, and preferably at least about 200, cycles abrasive scrub.

EXAMPLES

The following examples demonstrate the preparation of an exemplary polymer, binder, and paint within the scope of the present invention. In order to demonstrate the need to prepare the binder, in a manner such that its constituent (i) polymer within the scope of the present invention and (ii) film former are substantially inseparable by chromatographic means, one example is provided that contrasts the properties of two very similar paints. Both paints comprise a binder that contains the same film former and the same polymer. The sole difference between the paints is that one binder is made by polymerizing monomers in a reactor to synthesize the film former while adding the polymer to the reactor during at least a portion of the synthesis procedure. The other binder is made by simply blending the polymer with a previously prepared film former.

EXAMPLE 1

Polymer Synthesis

Water (816 g), Siponate A246L brand anionic surfactant available from Alcolac (19 g), 2-hydroxyethyl acrylate (56 g), itaconic acid (35 g), Sipomer WAM brand adhesion promoter monomer (33 g), and vinyl acetate (28 g) were charged to a reactor. The contents of the reactor were mixed. While purging the reactor with nitrogen, the reactor was heated to about 90° C. When the reactor reached about 90° C., an initiator solution comprising about 13 g water and about 1.5 g sodium persulfate was added to the reactor. The reaction was continued for about 3 hours and then the reactor was cooled.

EXAMPLE 2

Synthesis of Chain-Entangled Binder

A binder was prepared by charging water (about 367 g), Alipal EP-110 brand anionic surfactant available from GAF (about 99 g, 35% active), and sodium bicarbonate about 2.6 g) to a reactor. The reactor was heated to about 70° C. while purging the reactor with nitrogen. About 19 ml of an initiator solution comprising about 71 g water and about 3.6 g potassium persulfate was then added to the reactor. Afterwards, (i) the remaining portion of the initiator solution and (ii) a monomer mixture containing about 663 g vinyl acetate and about 117 g 2-ethylhexyl acrylate were added to the reactor over a period of about 3 hours. Another feed, comprising about 39 g water and about 120 g of the polymer of Example 1, was simultaneously added to the reactor during about the last 1.5 hours of the addition period.

After the addition of all 3 feeds was finished, the reactor was held at about 70° C. for about the next 30 minutes. Next, two post-addition solutions were added to the reactor. One post-addition solution contained about 7.8 g water and about 0.78 g tert-butyl hydrogen peroxide and the other post-addition solution contained about 7.8 g water and about 0.78 g hydro AWC brand reducing agent. The reactor was cooled after adding the post-additive solutions.

EXAMPLE 3

Synthesis of Binder Devoid of Polymer

Another binder was prepared by the same procedure set forth in Example 2, supra, with one modification, namely, the polymer of Example 1 was not added at any time during the synthesis of the binder.

EXAMPLE 4

Preparation of Blended Binder

A binder prepared according to the procedure set forth in Example 3, supra, was blended with about 120 g of the polymer of Example 1. The blending was performed at ambient temperature using good mechanical mixing for about 20 to about 30 minutes. Afterwards, the blend was allowed to stand at ambient temperature for about 18 hours.

EXAMPLES 5-7

Preparation of Semi-gloss Paints

Three semi-gloss paints (formulated at about 25 PVC) were each prepared by combining propylene glycol, water, Natrosol 250 HR brand hydroxyethyl cellulose (available from Aqualon), Colloid 681-F brand defoaming agent (available from Colloids, Inc.), Tamol 731 brand dispersing aid (25 percent active; available from Rohm & Haas Co.), AMP-95 brand base (available from Angus Chemical), Igepal CO-610 brand nonionic surfactant (available from GAF), PMA-30 brand biocide (available from Troy Chemical), and Tronox CR-800 brand titanium dioxide (available from Kerr-McGee) in the proportion set forth in Table I below.

TABLE I

| Material | Weight, g | Volume, ml |
|---|---|---|
| Propylene glycol | 681.0 | 659.6 |
| Water | 2061.3 | 2061.3 |
| Natrosol 250 HR | 34.6 | 26.4 |
| Colloid 681-F | 9.9 | 11.5 |
| Tamol 731 | 79.2 | 72.6 |
| AMP-95 | 29.7 | 32.2 |
| Igepal CO-610 | 19.8 | 18.1 |
| PMA-30 | 9.9 | 8.2 |
| Tronox CR-800 | 2474.6 | 604.4 |

The material combination listed in Table I was dispersed at a high speed to a National Standard rating of about 7. Next, the ingredients set forth in Table II were added to the ground mixture.

TABLE II

| Material | Weight, g | Volume, ml |
|---|---|---|
| Texanol$^a$ | 130.7 | 136.9 |
| Colloid 681-F | 19.8 | 23.1 |
| Water | 989.8 | 989.4 |
| 55% testing vinyl acrylic$^b$ | 3959.3 | 3627.9 |
| Triton GR-5$^c$ | 19.8 | 16.5 |

$^a$Texanol brand coalescing aid (available from Eastman Kodak).
$^b$The binder of Example 2, 3 or 4.
$^c$Triton GR-5 brand anionic surfactant (available from Rohm & Haas Co.).

Each paint had the composition set forth in Table III and the physical properties set forth in Table IV.

TABLE III

| Paint Formulation | |
|---|---|
| | Weight, g |
| Paste | 92.40 |
| Texanol | 2.24 |
| Colloid 681-F | 0.34 |
| Water | 16.94 |
| 55% TS Latex$^d$ | 67.75 |
| Triton GR-5 | 0.34 |
| Total Weight | 180.00 g |
| Total Volume | 141.84 ml |

$^d$TS denotes "total solids".

TABLE IV

| Physical Properties | |
|---|---|
| Viscosity, KU | 73-85 |
| Density | 10.57 lbs/gal |
| P.V.C. | 24.7% |
| % Solids | |
| By Weight | 44.5% |
| By Volume | 29.9% |

TABLE IV-continued

| Physical Properties | |
|---|---|
| pH | 9.5+/−0.5 |

EXAMPLES 8-10

Preparation of Flat Paints

Three flat paints (having a PVC content of about 60) were each prepared by combining water, Natrosol 250 HR brand hydroxyethyl cellulose, AMP-95 brand base, Tamol 731 brand dispersing aid, Igepal CO-630 brand nonionic surfactant, ethylene glycol, Colloidal 681-F brand defoamer, Super Ad-it brand biocide (available from Huls-America), Tronox CR-801 brand titanium dioxide, Satin Tone #1 brand extender (available from Engelhard), and Snowflake brand extender (available from ECC America) in the proportions set forth in Table V below.

TABLE V

| Material | Weight, g | Volume, ml |
|---|---|---|
| Water | 2131.5 | 2131.4 |
| Natrosol 250 HR | 25.0 | 19.5 |
| AMP-95 | 19.5 | 20.9 |
| Tamol 731 | 27.8 | 25.0 |
| Igepal CO-630 | 16.7 | 15.8 |
| Ethylene Glycol | 103.5 | 92.7 |
| Colloid 681-F | 11.1 | 12.0 |
| Super Ad-it | 5.6 | 5.1 |
| Tronox CR-801 | 1112.5 | 276.6 |
| Satin Tone #1 | 834.4 | 317.4 |
| Snowflake | 1112.5 | 411.9 |

The material combination listed in Table V was ground at a high speed to a National Standard rating of about 4. Next, Texanol brand coalescing aid, Colloidal 681-F brand defoamer, and 55% testing vinyl acrylic were added to the ground mixture in the proportions stated in Table VI below.

TABLE VI

| Material | Weight, g | Volume, ml |
|---|---|---|
| Texanol | 38.9 | 40.8 |
| Colloid 681-F | 11.1 | 12.0 |
| 55% testing vinyl acrylic | 1418.4 | 1312.7 |

Each paint had the formulation and physical properties set forth in Tables VII and VIII, respectively.

TABLE VII

| Paint Formulation | |
|---|---|
| | Weight, g |
| Paste | 196.52 |
| Texanol | 1.42 |
| Colloid 681-F | 0.41 |
| 55% TS Latex | 51.66 |
| Total Weight | 250.00 g |
| Total Volume | 170.70 ml |

TABLE VIII

| Physical Properties | |
|---|---|
| Viscosity, KU | 85-95 |
| Density | 12.2 lbs/gal |
| P.V.C. | 60% |
| % Solids | |
| By Weight | 56.3% |
| By Volume | 36.1% |

TABLE VIII-continued

| Physical Properties | |
|---|---|
| pH | 9.5+/−0.5 |

EXAMPLES 11-13

Wet Adhesion Test

Wet adhesion tests were conducted according to the procedure described in Appendix A. The results of the wet adhesion test are set forth in Table IX, infra.

TABLE IX

| | Binder | | | Paint | | |
|---|---|---|---|---|---|---|
| | | | | Semi-gloss | | |
| Ex. | TS %[a] | pH | Particle Size[b] | Wet Adhesion[c] | Krebs Visc[d] | Flat Scrub[e] |
| 2 | 55.2 | 3.82 | 348 | 184 | 76 | 0.74 |
| 3 | 55.1 | 4.41 | 122 | 19 | 69 | 0.34 |
| 4 | ND[f] | ND | ND | 3 | 86 | 0.30 |

[a]TS % denotes weight percent total solids.
[b]Particle size measured in nm.
[c]Wet adhesion measured in terms of cycles wet scrub resistance on aged gloss alkyd paint.
[d]Krebs Visc denotes Krebs Viscosity measured in Krebs Units at about 25° C.
[e]Scrub measured in terms of percent of a commercial standard (76RES3077 [UNOCAL]).
[f]ND denotes "not determined."

As seen from Table IX, a semi-gloss paint prepared using the chain-entangled binder of Example 2 exhibits a remarkably improved wet adhesion when compared to paint formulations that only differ in that their binder is either devoid of a polymer within the scope of present invention (Example 3's binder) or prepared by blending the film former with the polymer (Example 4's binder).

EXAMPLES 14-17

High-Shear Viscosity

The high-shear viscosity of each paint formulation was determined using an ICI cone and plate viscometer according to the manufacturer's instructions. The results of these tests are set forth in Table IX, supra. As shown in Table IX, a paint employing the chain-entangled binder of Example 2 has a high shear or ICI viscosity substantially improved over paint formulations that only differ in that their binder is either devoid of a polymer within the scope of present invention or prepared by blending the film former with the polymer.

EXAMPLES 18-19

Scrub Test

The ability of each paint formation to withstand scrubbing was determined accordingly to ASTM Method D-2486-79, this publication being incorporated herein in its entirety by reference. The results of the scrub test are indicated in the above Table IX. The data indicate that paints prepared with the chain-entangled binder of Example 2 have a scrub resistance over twice that of paints prepared with either a binder that is devoid of a polymer of the present invention or with a binder prepared by blending a film former and the polymer.

Accordingly, improved wet adhesion, ICI viscosity, and scrub resistance are exhibited by paint formulations incorporating binders prepared by delay-adding polymers within the scope of the present invention during the synthesis of the binder or otherwise making the polymer and the film former component of the binder physically inseparable from each other.

Although the present invention has been described in considerable detail with reference to certain preferred versions thereof, other versions are possible. For example, a paint can include one or more ingredients that enhance other paint properties. Therefore, the spirit and scope of the appended claims should not necessarily be limited to the description of the preferred embodiments contained herein.

APPENDIX A

Wet-Adhesion/Underwater Scrub Resistance

1. SCOPE. This method tests the adhesion of a latex gloss or semi-gloss paint to an alkyd substrate when scrubbed underwater.
2. METHOD SUMMARY. Test films are cast side-by-side over a cured alkyl substrate and allowed to dry. The dry films are cut through with a razor blade and the panels are tested for underwater adhesion and scrub resistance on a standard laboratory scrub tester. The films are scrubbed underwater for 2000 cycles or until failure occurs. To pass, there shall be no evidence of failure of adhesion between the test paint film and the alkyl undercoat through 2000 scrub cycles (4000 brush strokes).
3. APPARATUS AND MATERIALS
   Vacuum Plate
   Leneta Black Scrub Test Panel (Form P121-10N)
   Black Alkyd Enamel Paint (conforming to TT-E-489)
   6-Inch Wide 6-mil Doctor Blade Applicator
   3-Inch Wide 3-mil Doctor Blade Applicator
   New Single-Edge Razor Blade
   Gardner Straight-Line Washability and Abrasion Machine (Described in method 6141 of Fed. Test Method Std. No. 141)
   Natural-Bristle Scrub-Brush and Holder (Described in method 6142 of Fed. Test Method Std. No. 141)
   Tap Water
   Ruler with ¼-inch divisions
4. PROCEDURE
   4.1 SUBSTRATE. All films are cast with the substrate panel held securely on a vacuum plate. On a Leneta Black Scrub Test Panel (Form P121-10N), a black alkyd enamel conforming to TT-E-489 is cast lengthwise in a six-inch-side film using a 6-mil doctor blade applicator. The film is allowed to cure at 77° F.±3° F. and 50%±5% relative humidity for a period of not less than six weeks and not more than 3 months, prior to the application of the test paint.
   4.2 SAMPLE FILMS. The test paint is usually applied side-by-side with a latex paint standard. Using a 3-inch wide 6-mil doctor blade applicator, the two samples are applied width-wise across the alkyd substrate, centered left-to-right and one inch apart. Two panels are prepared for each test paint: one with the standard on the left and the test sample on the right, and the other with the standard and sample reversed. The test films are allowed to cure at 77° F.±3° F. and 50%±5% relative humidity for a period of three days prior to undergoing the test procedures.
   4.3 TESTING. With the plastic panel sitting flat on a hard, smooth surface, a new single-edge razor blade is used to cut through each test film, down the center along the axis on which it was drawn. Care should be taken not to cut through the plastic panel, as well.

The Leneta test panel is clamped into the trough of a Gardner Straight-Line Washability and Abrasion Machine) FTMS No. 141, Method 6141). Tap water is added to the trough until the test (FTMS No. 141, Method 6142) is placed in an appropriate holder and hooked up to the cables of the machine. The machine is started and is run continuously for 2000 scrub cycles (4000 brush strokes) or until each test film has broken.

5. CALCULATIONS. A film is deemed to have failed, or "broken," when it has peeled back more than ¼ inch from the razor cut. Data should be reported as "pass" (sample demonstrated no peel-back over 2000 scrub cycles), "partial failure" (sample ran 2000 cycles and suffered less than ¼-inch peel-back), or "failed at xxx cycles" (sample suffered greater than ¼-inch peel-back at the given number of cycles). Another option would be to report data as "2000+ cycles" for passing samples and partial failures, and "xxx cycles" for failing samples.

6. PRECISION AND ACCURACY. The two test results for each sample (one from each of the two prepared panels) should agree within a 25% confidency margin. A difference of greater than 25% between the two values does not support reproducability of the test.

7. REMARKS. The purpose in choosing the film applicator bars as indicated is to achieve—with both the alkyd substrate and with the sample films—dry films about 4 mils thick.

What is claimed is:

1. An aqueous polymeric composition formed by reacting in water and in the presence of an initiator:
   (a) about 15 to about 35 weight percent of a substantially non-self-polymerizable monomer selected from the group consisting of itaconic acid, maleic acid, fumaric acid, itaconate ester, maleate ester, fumarate ester, and mixtures thereof;
   (b) about 40 to about 70 weight percent of a copolymerizable monomer selected from the group consisting of N-vinyl lactams having the formula

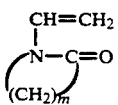

wherein m is an integer from about 3 to about 5; acrylates having the formula

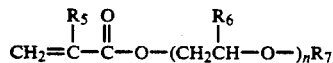

and acrylamides having the formula

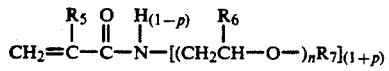

wherein $R_5$ and $R_6$ are independently hydrogen or methyl, $R_7$ is hydrogen or an alkyl group, n is an integer from 1 to about 30, and p is either 0 or 1; and
   (c) about 10 to about 35 weight percent of a wet adhesion promoting monomer selected from the group consisting of ethyleneureido-containing monomers, cyanoacetoxy-containing monomers, acetoacetoxy-containing monomers, and hydroxymethyl diacetone acrylamide, wherein the non-self-polymerizable monomer, the copolymerizable monomer, and the wet adhesion promoting monomer constitute at least 98 weight percent of the monomers employed in forming the aqueous polymeric composition.

2. The aqueous polymeric composition of claim 1 wherein the non-self-polymerizable monomer is selected from the group consisting of itaconic acid, maleic acid, fumaric acid, and mixtures thereof.

3. The aqueous polymeric composition of claim 2 formed by reacting about 20 to about 30 weight percent of the non-self-polymerizable monomer, about 40 to about 60 weight percent of the copolymerizable monomer, and about 15 to about 30 weight percent of the wet adhesion promoting monomer.

4. The aqueous polymeric composition of claim 2 wherein $R_7$ is hydrogen and n is 1.

5. The aqueous polymeric composition of claim 2 wherein the copolymerizable monomer is selected from the group consisting of 2-hydroxyethyl acrylate, 2-hydroxyethyl methacrylate, and mixtures thereof.

6. The aqueous polymeric composition of claim 2 wherein the wet adhesion promoting monomer is an ethyleneureido-containing monomer selected from the group consisting of 2-ethyleneureido-ethyl acrylate, 2-ethyleneureido-ethyl methacrylate, 2-ethyleneureido-ethyl acrylamide, 2-ethyleneureido-ethyl methacrylamide, 1-[2-(3-allyloxy-2-hydroxypropylamino)ethyl]imidazolidin-2-one, and mixtures thereof.

7. An aqueous binder composition comprising:
   (a) the aqueous polymeric composition of claim 2;
   (b) a high molecular weight film former, wherein the aqueous polymeric composition has a solids content and, based upon the total solids content of the aqueous binder composition, the aqueous binder composition comprises about 0.5 to about 3 weight percent of the aqueous polymeric composition solids content and about 97 to about 99.5 weight percent of the high molecular weight film former.

8. An aqueous polymeric composition formed by reacting in water and in the presence of an initiator;
   (a) 35 to about 65 weight percent of a substantially non-self-polymerizable monomer selected from the group consisting of itaconic acid, maleic acid, fumaric acid, itaconate ester, maleate ester, fumarate ester, and mixtures thereof; and
   (b) about 35 to about 65 weight percent of a wet adhesion promoting monomer selected from the group consisting of ethyleneureido-containing monomers, cyanoacetoxy-containing monomers, acetoacetoxy-containing monomers, and hydroxymethyl diacetone acrylamide, wherein the non-self-polymerizable monomer and the wet adhesion promoting monomer constitute at least 98 weight percent of the monomers employed in forming the aqueous polymeric composition.

9. The aqueous polymeric composition of claim 8 wherein the non-self-polymerizable monomer is selected from the group consisting of itaconic acid, maleic acid, fumaric acid, and mixtures thereof.

10. An aqueous polymeric composition formed by reacting in water and in the presence of an initiator:
    (a) about 15 to about 35 weight percent of a substantially non-self-polymerizable monomer selected from the group consisting of itaconic acid, maleic acid, fumaric acid, and mixtures thereof;

(b) about 30 to about 70 weight percent of a copolymerizable monomer selected from the group consisting of N-vinyl lactams having the formula

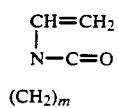

wherein m is an integer from about 3 to about 5; acrylates having the formula

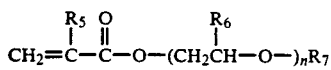

and acrylamides having the formula

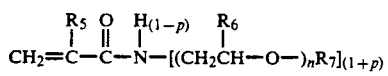

wherein $R_5$ and $R_6$ are independently hydrogen or methyl, $R_7$ is hydrogen or an alkyl group, n is an integer from 1 to about 30, and p is either 0 or 1;
(c) about 10 to about 35 weight percent of a wet adhesion promoting monomer selected from the group consisting of ethyleneureido-containing monomers, cyanoacetoxy-containing monomers, acetoacetoxy-containing monomers, and hydroxymethyl diacetone acrylamide; and
(d) about 1 to about 30 weight percent of a monomer selected from the group consisting of ethylene, vinyl halides, vinylidene halides, vinyl acetate, acrylate monomers having the formula

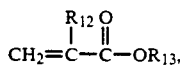

acrylamide monomers having the formula

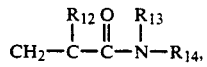

alkenyl aromatic monomers, alkadiene monomers, and mixtures thereof,
wherein $R_{12}$ is selected from the group consisting of hydrogen, alkyl groups containing 1 to about 6 carbon atoms, and halo-substituted alkyl groups containing 1 to about 6 carbon atoms, $R_{13}$ and $R_{14}$ are each an alkyl group that independently contains up to about 18 carbon atoms, and the monomers of (a)-(d) comprise at least 98 weight percent of the monomers employed in forming the aqueous polymeric composition.

11. The aqueous polymeric composition of claim 10 formed by reacting the substantially non-self-polymerizable monomer, the copolymerizable monomer, the wet adhesion promoting monomer, and about 1 to about 30 weight percent of the monomer (d) selected from the group consisting of vinyl halides, vinylidene halides, vinyl acetate, acrylate monomers having the formula

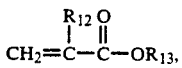

acrylamide monomers having the formula

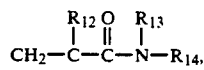

alkenyl aromatic monomers having the formula

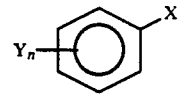

wherein X is an aliphatic radical containing at least one alkenyl bond, Y is a substituent on the aromatic ring, and n is an integer of from 0 to about 5, alkadiene monomers having the formula

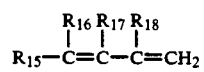

wherein $R_{15}$, $R_{16}$, $R_{17}$, and $R_{18}$ are each independently selected from the group consisting of hydrogen, halogen, and alkyl radicals containing 1 to about 2 carbon atoms, and mixtures thereof.

12. The aqueous polymeric composition of claim 9 formed by reacting about 45 to about 55 weight percent of the non-self-polymerizable monomer, and about 45 to about 55 weight percent of the wet adhesion promoting monomer.

13. An aqueous polymeric composition formed by reacting in water and in the presence of an initiator:
(a) 35 to about 65 weight percent of a substantially non-self-polymerizable monomer selected from the group consisting of itaconic acid, maleic acid, fumaric acid, and mixtures thereof;
(b) about 35 to about 65 weight percent of a wet adhesion promoting monomer selected from the group consisting of ethyleneureido-containing monomers, cyanoacetoxy-containing monomers, acetoacetoxy-containing monomers, and hydroxymethyl diacetone acrylamide; and
(c) about 1 to about 30 weight percent of a monomer selected from the group consisting of ethylene, vinyl halides, vinylidene halides, vinyl acetate, acrylate monomers having the formula

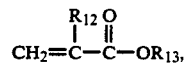

acrylamide monomers having the formula

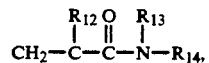

alkenyl aromatic monomers, alkadiene monomers, and mixtures thereof, wherein $R_{12}$ is selected from the group consisting of hydrogen, alkyl groups containing 1 to about 6 carbon atoms, and halo-substituted alkyl groups containing 1 to about 6 carbon atoms, $R_{13}$ and $R_{14}$ are each an alkyl group that independently contains up to about 18 carbon atoms, and the monomers of (a)-(c) comprise at least 98 weight percent of the monomers employed in forming the aqueous polymeric composition.

14. The aqueous binder of claim 7 wherein the film former comprises a monomer selected from the group consisting of ethylene, vinyl acetate, acrylate monomers having the formula

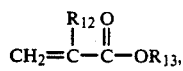

acrylamide monomers having the formula

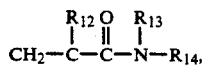

wherein $R_{12}$ is selected from the group consisting of hydrogen, alkyl groups containing 1 to about 6 carbon atoms, and halo-substituted alkyl groups containing 1 to about 6 carbon atoms, and $R_{13}$ and $R_{14}$ are each an alkyl group that independently contains up to about 18 carbon atoms, alkenyl aromatic monomers having the formula

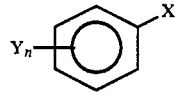

wherein X is an aliphatic radical containing at least one alkenyl bond, Y is a substituent on the aromatic ring, and n is an integer of from 0 to about 5, alkadiene monomers having the formula

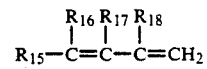

wherein $R_{15}$, $R_{16}$, $R_{17}$, and $R_{18}$ are each independently selected from the group consisting of hydrogen, halogen, and alkyl radicals containing 1 to about 2 carbon atoms, and mixtures thereof.

15. The aqueous binder composition of claim 7 comprising about 0.7 to about 1.7 weight percent of the aqueous polymeric composition solids content and about 98.3 to about 99.3 weight percent of the high molecular weight film former.

16. The aqueous polymeric composition of claim 2 formed by reacting about 20 to about 30 weight percent of the non-self-polymerizable monomer, about 45 to about 60 weight percent of the copolymerizable monomer, and about 15 to about 30 weight percent of the wet adhesion promoting monomer.

17. An aqueous binder composition comprising:
(a) the aqueous polymeric composition of claim 9; and
(b) a high molecular weight film former, wherein the aqueous polymeric composition has a solids content and, based upon the total solids content of the aqueous binder composition, the aqueous binder composition comprises about 0.5 to about 3 weight percent of the aqueous polymeric composition solids content and about 97 to about 99.5 weight percent of the high molecular weight film former.

* * * * *